(12) United States Patent
Park

(10) Patent No.: US 9,448,431 B2
(45) Date of Patent: Sep. 20, 2016

(54) IMAGE DISPLAY APPARATUS

(71) Applicant: Samsung Display Co., Ltd., Yongin, Gyeonggi-Do (KR)

(72) Inventor: SungHwan Park, Yongin (KR)

(73) Assignee: Samsung Display Co., Ltd., Samsung-ro, Giheung-Gu, Yongin-si, Gyeonggi-Do (KR)

( * ) Notice: Subject to any disclaimer, the term of this patent is extended or adjusted under 35 U.S.C. 154(b) by 135 days.

(21) Appl. No.: 13/955,878

(22) Filed: Jul. 31, 2013

(65) Prior Publication Data

US 2014/0226206 A1    Aug. 14, 2014

(30) Foreign Application Priority Data

Feb. 12, 2013   (KR) .................. 10-2013-0014964

(51) Int. Cl.
*G02F 1/1335* (2006.01)
*G02F 1/1333* (2006.01)

(52) U.S. Cl.
CPC ... *G02F 1/133528* (2013.01); *G02F 1/133308* (2013.01); *G02F 1/133512* (2013.01); *G02F 2001/133331* (2013.01)

(58) Field of Classification Search
CPC ............. G02B 5/005; G02B 5/30–5/305; G02B 5/3083; G02B 5/32; G02B 27/022; G02B 27/024; G02B 27/026; G02B 27/28; G02F 1/133528; G02F 1/133543; G02F 1/133545; G02F 1/133548; G02F 1/13363; G02F 2001/133638; G02F 1/133308; G02F 1/133512; G02F 2001/133331; G02F 1/133638; F21V 9/14
USPC ............. 359/450, 483.01, 485.01–485.05, 359/487.01–489.01, 489.07, 580, 582, 609, 359/893; 349/96–103, 122, 194; 362/19, 362/351; 428/1.3, 1.5, 38; 264/1.31, 1.34, 264/1.7; 427/163.1
See application file for complete search history.

(56) References Cited

U.S. PATENT DOCUMENTS

| | | | |
|---|---|---|---|
| 8,698,776 B2 * | 4/2014 | Kurashima | G06F 3/044 |
| | | | 324/679 |
| 2002/0015120 A1 * | 2/2002 | Kameyama et al. | 349/95 |
| 2011/0242057 A1 | 10/2011 | Lee et al. | |
| 2012/0068959 A1 | 3/2012 | Kim et al. | |
| 2012/0075838 A1 | 3/2012 | Lee et al. | |

(Continued)

FOREIGN PATENT DOCUMENTS

| KR | 1020110019157 A | 2/2011 |
|---|---|---|
| KR | 1020110110562 A | 10/2011 |

(Continued)

*Primary Examiner* — Stephone B Allen
*Assistant Examiner* — Adam W Booher
(74) *Attorney, Agent, or Firm* — Robert E. Bushnell, Esq.

(57) ABSTRACT

An image display apparatus includes a display panel that displays an image and a window layer disposed on the display panel and including a display area transmitting the image and a non-display area surrounding the display area. The window layer includes a window cover disposed to face the display panel, a decorated printed layer disposed on a lower surface of the window cover in the non-display area, and a polarization layer disposed on the lower surface of the window cover in the display area and disposed in the non-display area to cover the decorated printed layer. An inner side surface of the decorated printed layer makes contact with a side surface of the polarization layer at a boundary surface between the display area and the non-display area.

8 Claims, 5 Drawing Sheets

(56) References Cited

U.S. PATENT DOCUMENTS

2012/0249453 A1 10/2012 Tsukamoto
2012/0268402 A1 10/2012 Wang et al.
2013/0057495 A1 3/2013 Wang et al.

FOREIGN PATENT DOCUMENTS

| KR | 1020120030830 A | 3/2012 |
| KR | 1020120060962 A | 6/2012 |

* cited by examiner

IMAGE DISPLAY APPARATUS

CLAIM OF PRIORITY

This U.S. non-provisional patent application claims priority under 35 U.S.C. §119 of Korean Patent Application No. 10-2013-0014964, filed on Feb. 12, 2013, the contents of which are hereby incorporated by reference in its entirety.

BACKGROUND OF THE INVENTION

1. Field of the Invention

Embodiments of the present invention generally relate to an image display apparatus, and more particularly, to an image display apparatus capable of improving defects caused by a step difference at a window layer thereof.

2. Description of the Related Art

In general, electronic devices, such as a smart phone, a digital camera, a notebook computer, a navigation system, a smart television set, etc., include an image display apparatus to display an image. The image display apparatus includes a display panel that generates and displays the image and a window layer disposed on the display panel to protect the display panel.

As the display panel, various display panels, e.g., a liquid crystal display panel, an organic light emitting display panel, an electrowetting display panel, an electrophoretic display panel, etc., have been developed. The display panel is provided with a touch input function. For instance, the smart phone provided with the touch input function includes the organic light emitting display panel and a touch panel disposed on the organic light emitting display panel. Responsive to an input signal input by the touch panel, the organic light emitting display panel provides a user with the image corresponding to the input signal.

The image generated by the display panel is provided to the user after passing through the window layer. The window layer includes a display area displaying the image and a non-display area disposed adjacent to the display area. The non-display area of the window layer is designed to have various colors using a decorated printed layer. However, a step difference occurs between the display area and the non-display area due to the decorated printed layer.

SUMMARY OF THE INVENTION

The present disclosure provides an image display apparatus capable of improving defects caused by a step difference at a window layer thereof.

Embodiments of the inventive concept provide an image display apparatus including a display panel that displays an image and a window layer disposed on the display panel and including a display area transmitting the image and a non-display area surrounding the display area. The window layer includes a window cover disposed to face the display panel, a decorated printed layer disposed on a lower surface of the window cover in the non-display area, and a polarization layer disposed on the lower surface of the window cover in the display area and disposed in the non-display area to cover the decorated printed layer. An inner side surface of the decorated printed layer makes contact with a side surface of the polarization layer at a boundary surface between the display area and the non-display area.

The decorated printed layer has a first thickness, the polarization layer has a second thickness in the display area and a third thickness in the non-display area, and a sum of the first thickness and the third thickness is equal to the second thickness.

The polarization layer includes a first adhesive film disposed on the lower surface of the window cover in the display area, a polarization film disposed under the first adhesive film in the display area, a second adhesive film disposed on a lower surface of the decorated printed layer and a lower surface of the polarization film, and a retardation film disposed on a lower surface of the second adhesive film. The lower surface of the window cover is attached to an upper surface of the polarization film in the display area by the first adhesive film, the lower surface of the decorated printed layer and the lower surface of the polarization film are attached to an upper surface of the retardation film by the second adhesive film, and the inner side surface of the decorated printed layer makes contact with a side surface of the first adhesive film and a side surface of the polarization film at the boundary surface.

A sum of a thickness of the first adhesive film and a thickness of the polarization film is equal to the first thickness, a sum of the thickness of the first adhesive film, the thickness of the polarization film, a thickness of the second adhesive film, and a thickness of the retardation film is equal to the second thickness, and a sum of the thickness of the second adhesive film and the thickness of the retardation film is equal to the third thickness.

Each of the first and second adhesive films is an acrylic adhesive.

The image display apparatus further includes an adhesive member disposed between the polarization layer and the display panel, and the polarization layer is attached to the display panel by the adhesive member.

The decorated printed layer includes a plurality of printed layers each having a predetermined color.

Embodiments of the inventive concept provide an image display apparatus includes a display panel that displays an image and a window layer disposed on the display panel and including a display area transmitting the image and a non-display area surrounding the display area. The window layer includes a window cover disposed to face the display panel, a decorated printed layer disposed on a lower surface of the window cover in the non-display area, and a polarization layer disposed on the lower surface of the window cover in the display area. An inner side surface of the decorated printed layer makes contact with a side surface of the polarization layer at a boundary surface between the display area and the non-display area, and the polarization layer has a thickness thicker than a thickness of the decorated printed layer.

The polarization layer includes a first adhesive film disposed on the lower surface of the window cover, a polarization film disposed under the first adhesive film, a second adhesive film disposed on a lower surface of the polarization film, and a retardation film disposed under the second adhesive film, the lower surface of the window cover is attached to an upper surface of the polarization film in the display area by the first adhesive film. The lower surface of the polarization film and an upper surface of the retardation film are attached to each other by the second adhesive film, and the inner side surface of the decorated printed layer makes contact with a side surface of the first adhesive film and a side surface of the polarization film at the boundary surface.

According to the above, the image display apparatus may improve the defects caused by the step difference on the window layer.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION OF THE INVENTION

Figure 1:
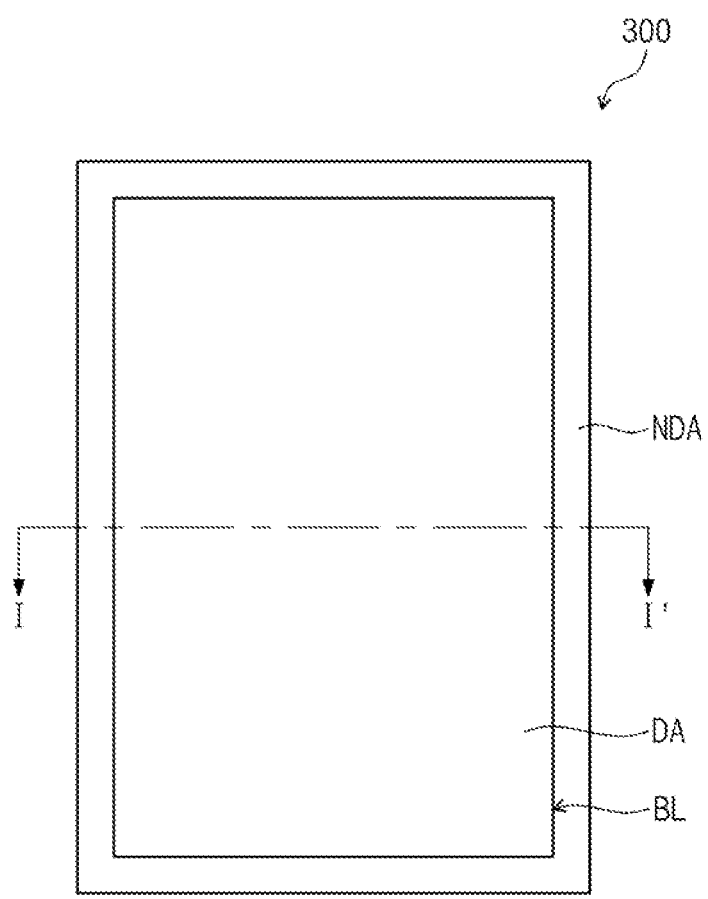
FIG. 1 is a top plan view showing an image display apparatus constructed as an embodiment according to the principles of the present invention.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

FIG. 1 is a top plan view showing an image display apparatus constructed as an embodiment according to the principles of the present disclosure.

Referring to FIG. 1, the image display apparatus 300 includes a display area DA and a non-display area NDA surrounding the display area DA in a top plan view. The display area DA displays an image provided to a viewer and the non-display area NDA does not display the image.

The non-display area NDA is printed in a black color, but it should not be limited to the black color. That is, the non-display area NDA may be printed in various colors except for the black color, e.g., a white color.

An upper surface area of the image display apparatus 300 shown in FIG. 1 corresponds to a surface area of a window layer, and this will be described in detail with reference to FIG. 2.

Figure 2:
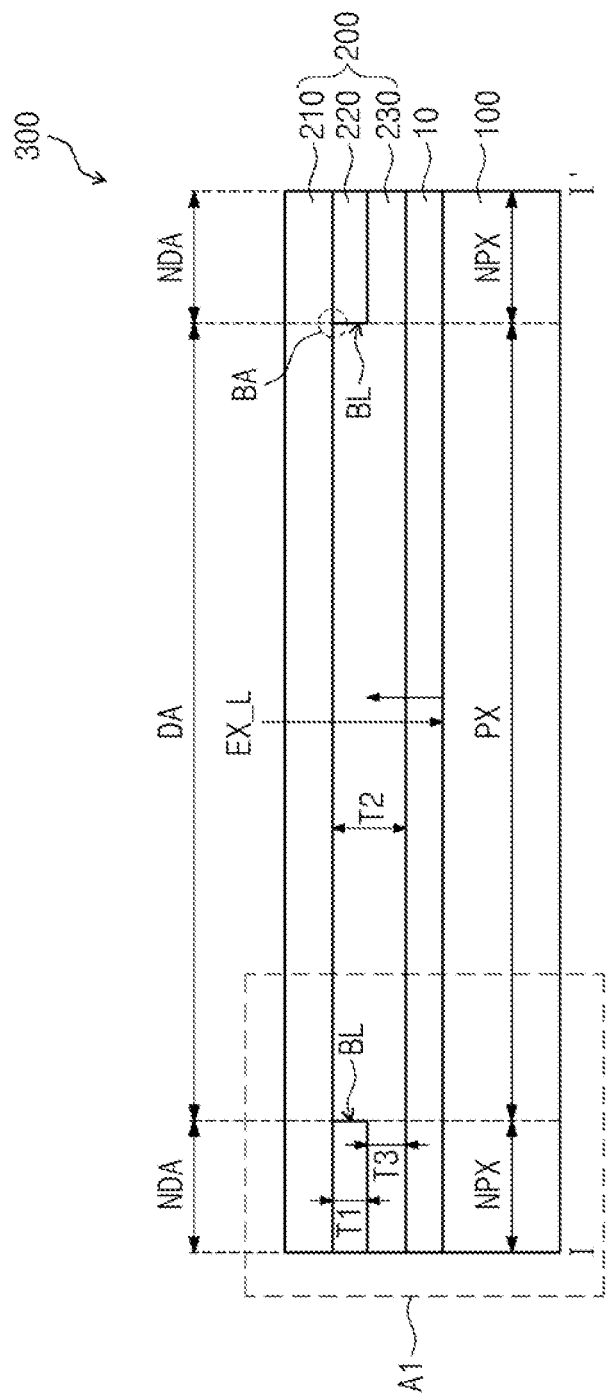
FIG. 2 is a cross-sectional view taken along a line I-I' shown in FIG. 1.

FIG. 2 is a cross-sectional view taken along a line I-I' shown in FIG. 1.

Referring to FIG. 2, the image display apparatus 300 includes a display panel 100, a window layer 200 disposed on the display panel 100, and an adhesive member 10 attaching the display panel 100 and the window layer 200.

The display panel 100 generates the image. The image generated by the display panel 100 is provided to the viewer after passing through the window layer 200. The window layer 200 is disposed on the display panel 100 to protect the display panel 100 from an external scratch.

The upper surface of the display panel 100 is attached to a lower surface of the window layer 200 by the adhesive member 10. The adhesive member 10 may be, but not limited to, an ultraviolet ray curable resin. That is, the adhesive member 10 may be an optically clear adhesive (OCA).

An external light is provided to the display panel 100 through the window layer 200. The external light provided to the display panel 100 is reflected by metal layers (not shown) disposed inside the display panel 100. The external light reflected by the display panel 100 is absorbed by the window layer 200 to block the reflected external light. Accordingly, the external light reflected by the display panel 100 is not provided to the viewer.

As described above, the plane surface of the window layer 200 includes the display area DA and the non-display area NDA surrounding the display area DA. The plane surface of the display panel 100 includes a pixel area PX and a non-pixel area NPX disposed adjacent to the pixel area PX. The pixel area PX of the display panel 100 corresponds to the display are DA of the window layer 200, and the non-pixel area NPX of the display panel 100 corresponds to the non-display area NDA of the window layer 200.

The image generated by the display panel 100 is displayed in the pixel area PX of the display panel 100 and not displayed in the non-pixel area NPX. Although not shown in figures, the display panel 100 includes a plurality of pixels arranged in the pixel area PX. In addition, the display panel 100 includes a driver arranged in the non-pixel area NPX to drive the pixels. The pixels are driven by the driver to generate the image. The image generated by the display panel 100 is provided to the viewer through the display area DA of the window layer 200.

The window layer 200 includes a window cover 210, a decorated printed layer 220, and a polarization layer 230. A plane surface of the window cover 210 includes the display area DA and the non-display area NDA surrounding the display area DA as the plane surface of the window layer 200. The window cover 210 is disposed to face the display panel 100.

The window cover 210 may be, but not limited to, a transparent film that transmits the light. Thus, the image generated in the pixel area PX of the display panel 100 transmits through the polarization layer 230 and the window cover 210 in the pixel area PX, and then is provided to the viewer.

The decorated printed layer 220 is disposed in the non-display area NDA of the lower surface of the window cover 210, which faces the display panel 100. The decorated printed layer 220 is formed of an organic material having a predetermined color. Therefore, the color of the decorated printed layer 220 is provided to the viewer in the non-display area NDA of the window layer 200.

The non-pixel area NPX of the display panel 100 corresponds to the non-display area NDA of the window layer 200. Accordingly, the driver disposed in the non-pixel area NPX of the display panel 100 is covered by the decorated printed layer 220 disposed in the non-display area NDA of the window layer 200, and thus the driver is not perceived to the viewer.

The decorated printed layer 220 may have a black color, but it should not be limited to the black color. That is, the decorated printed layer 220 may have various colors, e.g., a white color. The decorated printed layer 220 has a first thickness T1.

The polarization layer 230 is disposed on the lower surface of the window cover 210 to cover the decorated printed layer 230. In detail, the polarization layer 230 is disposed on the lower surface of the window cover 210 in the display area DA and disposed to cover the decorated printed layer 220 in the non-display area NDA. An inner surface of the decorated printed layer 220 makes contact with a side surface of the polarization layer 230 at a boundary surface BL between the display area DA and the non-display area NDA.

The polarization layer 230 has a second thickness T2 in the display area DA and a third thickness T3 smaller than the second thickness T2 in the non-display area NDA. The first thickness T1 is smaller than the second thickness T2, and a sum of the first thickness T1 and the third thickness T3 is equal to the second thickness T2.

The external light EX_L provided to the image display apparatus 300 is reflected by the metal layers disposed inside the display panel 100. The reflected light of the external light EX_L by the display panel 100 is absorbed by the polarization layer 230 to block the reflected external light. Thus, the external light EX_L reflected in the display panel 100 is not provided to the viewer. This configuration will be described in detail with reference to FIG. 3.

The adhesive member 10 is disposed between the polarization layer 230 and the display panel 100. The polarization layer 230 and the display panel 100 are attached to each other by the adhesive member 10. The adhesive member 10 is cured by the ultraviolet ray.

However, when the adhesive member 10 is disposed between the window cover 210 and the polarization layer 230, adhesion defects occur at the boundary surface BL. In detail, when the ultraviolet ray curable resin is coated on the lower surface of the window cover 210 as the adhesive member 10 to cover the decorated printed layer 220 and the upper surface of the polarization layer 230 is attached to the adhesive member 10, the adhesive member 10 is not coated in a vertical boundary area BA defined by the lower surface of the window cover 210 and the inner side surface of the decorated printed layer 220. That is, unwanted space, such as a gap, is formed in the vertical boundary area BA, and thus the adhesion defects occur. This is because of the step difference between the decorated printed layer 220 and the window cover 210, which is formed by the thickness of the decorated printed layer 220 disposed in the non-display area NDA.

According to an embodiment of the present invention, the polarization layer 230 makes contact with the inner side surface of the decorated printed layer 220 at the boundary surface BL between the display area DA and the non-display area NDA. Accordingly, the unwanted space, such as a gap, is not formed in the vertical boundary area BA, and thus the defects caused by the step difference between the decorated printed layer 220 and the window cover 210 may be improved.

Figure 3:
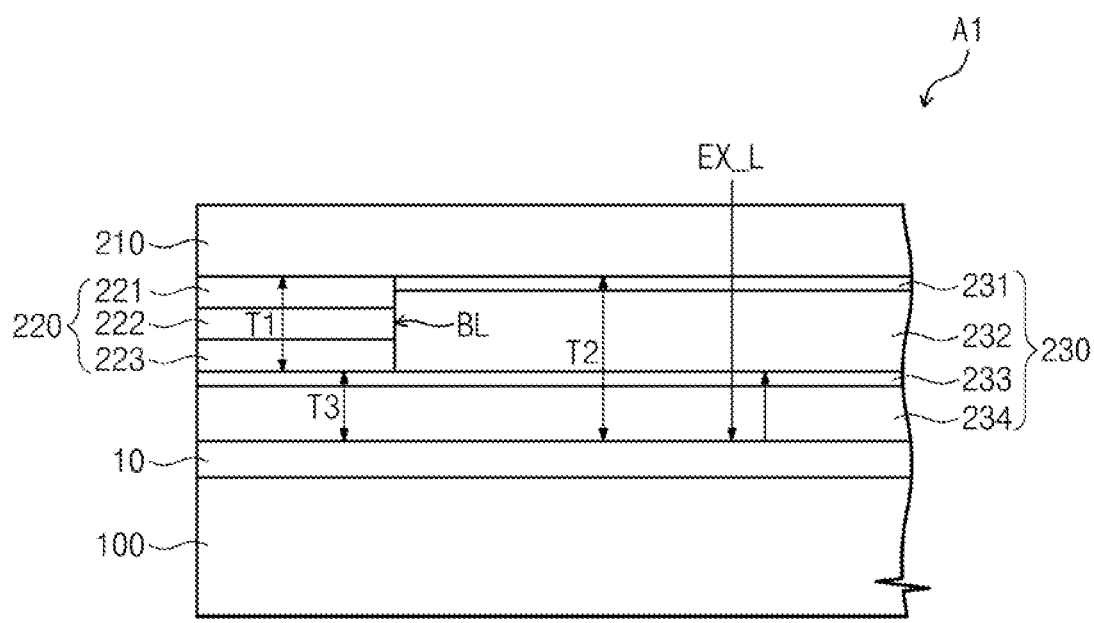
FIG. 3 is a partially enlarged view of a portion Al shown in FIG. 2.

FIG. 3 is a partially enlarged view of a portion A1 shown in FIG. 2. In detail, FIG. 3 shows detailed configuration of the decorated printed layer 220 and the polarization layer 230.

Referring to FIG. 3, the decorated printed layer 220 includes a plurality of printed layers 221, 222, and 223. The printed layers 221, 222, and 223 include a first printed layer 221 disposed on the lower surface of the window cover 210 in the non-display area NDA, a second printed layer 222 disposed on a lower surface of the first printed layer 221, and a third printed layer 223 disposed on a lower surface of the second printed layer 222. A sum of thicknesses of the first, second, and third printed layers 221, 222, and 223 corresponds to the first thickness T1. The first thickness T1 may at least have a predetermined thickness which is sufficient to prevent the non-pixel area NPX of the display panel from being seen by the viewer. The predetermined thickness may be determined by the color of the decorated printed layer 220.

The first, second, and third printed layers 221, 222, and 223 have the black color. When the plural printed layers having the black color are disposed on the lower surface of the window cover 210 in the non-display area, the black color is more clearly displayed when compared to the black color obtained by only one printed layer disposed on the lower surface of the window cover 210. Therefore, the black color may be displayed in the non-display area NDA by three printed layers, e.g., first, second, and third printed layers 221, 222, and 223.

In FIG. 3, three printed layers 221, 222, and 223 have been shown, but the number of the printed layers should not be limited to three. That is, three or more printed layers may be disposed on the window cover 210 in the non-display area NDA.

The polarization layer 230 includes a first adhesive film 231, a polarization film 232, a second adhesive film 233, and a retardation film 234. Each of the first adhesive film 231 and the polarization film 232 has the same area as the display area DA. The first adhesive film 231 and the polarization film 232 are disposed in the display area DA.

The first adhesive film 231 is disposed on the lower surface of the window cover 210 in the display area DA and the polarization film 232 is disposed on a lower surface of the first adhesive film 231. In the display area DA, the lower surface of the window cover 210 and the upper surface of the polarization film 232 are attached to each other by the first adhesive film 231. The first adhesive film 231 may be, but not limited to, an acrylic adhesive.

A sum of thicknesses of the first adhesive film 231 and the polarization film 232 is equal to the first thickness T1, and a sum of thicknesses of the first, second, and third printed layers 221, 222, and 223 is equal to the first thickness T1. Accordingly, the inner side surface of the first, second, and third printed layers 221, 222, and 223 makes contact with a side surface of the first adhesive film 231 and a side surface of the polarization film 232.

The second adhesive film 233 is disposed on a lower surface of the third printed layer 233 and a lower surface of the polarization film 232, and the retardation film 234 is disposed under the second adhesive film 233. The lower surfaces of the third printed layer 223 and the polarization film 232 are attached to an upper surface of the retardation film 234 by the second adhesive film 233. The second adhesive film 233 may be, but not limited to, an acrylic adhesive.

The adhesive member 10 is disposed under the retardation film 234 and the display panel 100 is disposed under the adhesive member 10. The upper surface of the display panel 100 and a lower surface of the retardation film 234 are attached to each other by the adhesive member 10.

A sum of thicknesses of the first adhesive film 231, the polarization film 232, the second adhesive film 233, and the retardation film 234 is set to the second thickness T2. A sum of thicknesses of the second adhesive film 233 and the retardation film 234 is set to the third thickness T2.

The external light EX_L is provided to the image display apparatus 300. The external light EX_L is polarized while passing through the polarization film 232. That is, the polarization film 232 transmits the external light that vibrates in only the same direction as a polarization axis of the polarization film 232.

A light axis of the external light EX_L is twisted by the retardation film 234. The external light EX_L having the twisted light axis by the retardation film 234 is reflected by the metal layers in the display panel 100. The light axis of the reflected light of the external light EX_L in the display panel 100 is twisted again by the retardation film 234.

The light axis of the reflected light of the external light EX_L, in which the light axis is twisted again by the retardation film 234, is substantially vertical to the polarization axis of the polarization film 232. Thus, the reflected light of the external light EX_L reflected by the display panel 100 does not transmit through the polarization film 232. That is, the external light EX_L reflected in the display panel 100 is absorbed by the polarization film 232. Therefore, the external light EX_L reflected in the display panel 100 is not provided to the viewer.

The side surfaces of the first adhesive film 231 and the polarization film 232 of the polarization layer 230 make contact with the inner side surface of the first, second, and third printed layers 221, 222, and 223 at the boundary surface BL. Accordingly, the predetermined space, such as a gap, is not formed in the vertical boundary area BA.

Consequently, the image display apparatus 300 may improve the defects caused by the step difference on the window layer 200.

Figure 4:
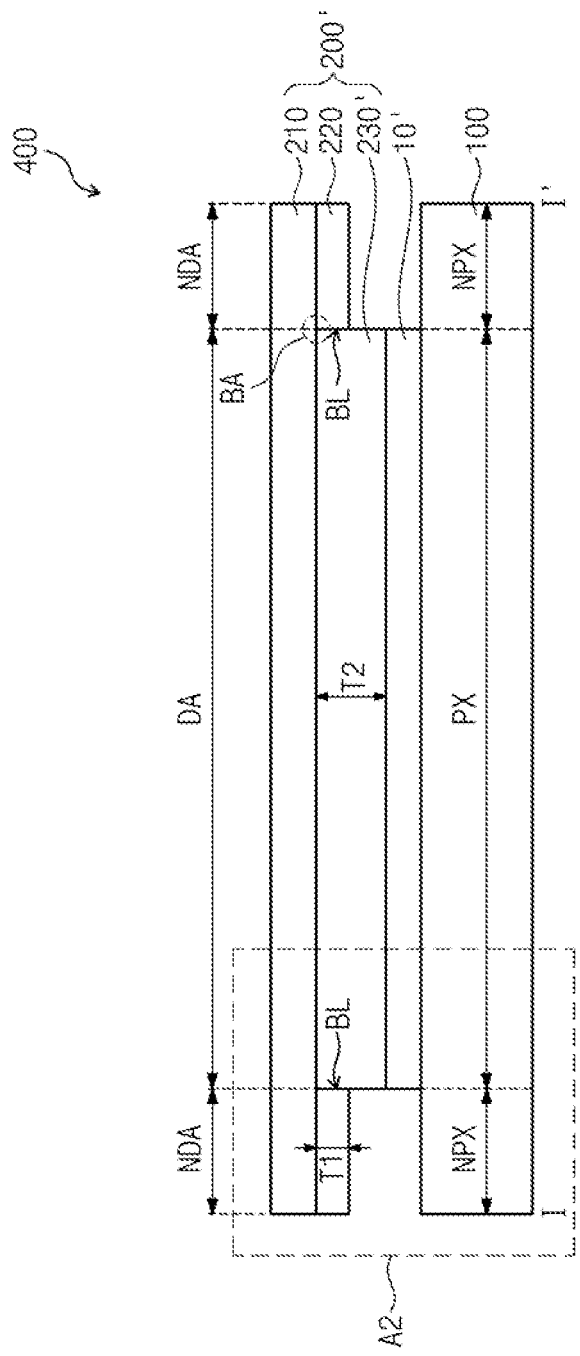
FIG. 4 is a cross-sectional view showing an image display apparatus constructed as another embodiment according to the principles of the present invention.
Figure 5:
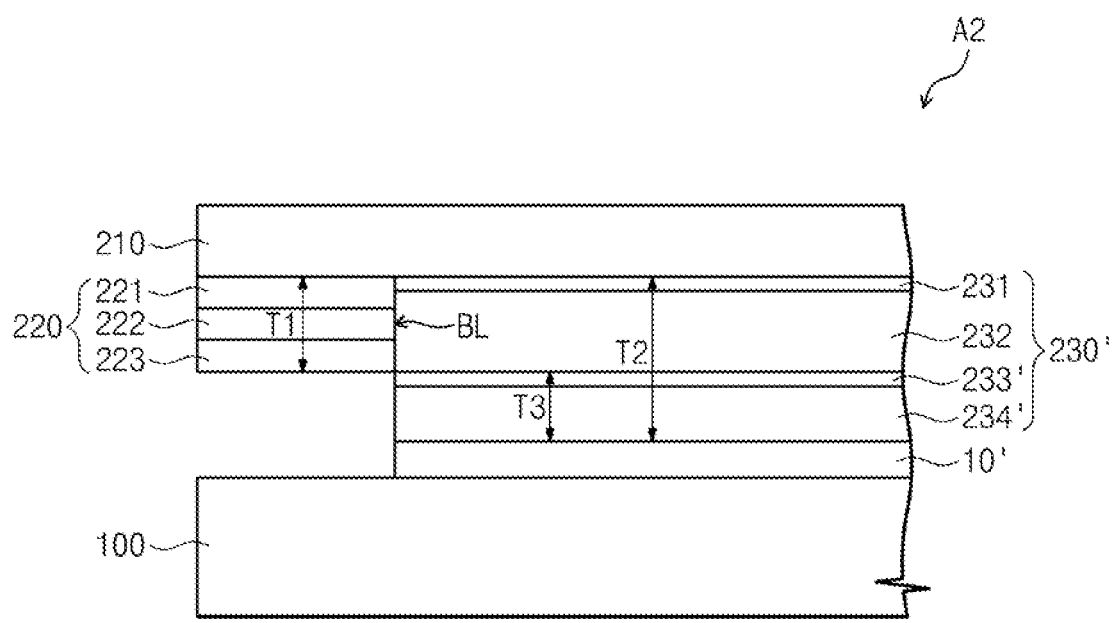
FIG. 5 is a partially enlarged view of a portion A2 shown in FIG. 4.

FIG. 4 is a cross-sectional view showing an image display apparatus constructed as another embodiment according to the principles of the present disclosure and FIG. 5 is a partially enlarged view of a portion A2 shown in FIG. 4.

In the present exemplary embodiment, an upper plane surface of an image display apparatus 400 is the same as the upper plane surface of the image display apparatus 300. Accordingly, FIG. 4 shows the cross-sectional view of the image display apparatus 400, which is taken along the line I-I' shown in FIG. 1.

The image display apparatus 400 shown in FIGS. 4 and 5 have the same structure and function as those of the image display apparatus 300 shown in FIGS. 2 and 3 except for the polarization layer 230. Therefore, in FIGS. 4 and 5, the same reference numerals denote the same elements in FIGS. 2 and 3, and thus detailed descriptions of the same elements will be omitted.

Referring to FIGS. 4 and 5, a polarization layer 230' is disposed under the window cover 210 in the display area DA. The inner side surface of the decorated printed layer 220 makes contact with a side surface of a polarization layer 230' at the boundary surface between the display area DA and the non-display area NDA. The polarization layer 230' has a thickness thicker than a thickness of the decorated printed layer 220. The decorated printed layer 220 has a first thickness T1 and the polarization layer has a second thickness T2 thicker than the first thickness T1.

The polarization layer 230' includes the first adhesive film 231, the polarization film 232, a second adhesive film 233', and a retardation film 234'. Each of the first adhesive film 231, the polarization film 232, the second adhesive film 233', and the retardation film 234' has the same area as that of the display area DA.

The first adhesive film 231 is disposed on the lower surface of the window cover 210 in the display area DA, and the polarization film 232 is disposed under the first adhesive film 231. The lower surface of the window cover 210 makes contact with the upper surface of the polarizing film 232 by the first adhesive film 231 in the display area DA.

A sum of thicknesses of the first adhesive film 231 and the polarization film 232 is set to the first thickness T1 and a sum of thicknesses of the first, second, and third printed layers 221, 222, and 223 is set to the first thickness T1. Thus, the inner side surface of the first, second, and third printed layers 221, 222, and 223 makes contact with the side surface of the first adhesive film 231 and the side surface of the polarization film 232 at the boundary surface BL.

The second adhesive film 233' is disposed on the lower surface of the polarization film 232 in the display area DA, and the retardation film 234' is disposed on the lower surface of the second adhesive film 233'. The upper surface of the retardation film 234' is attached to the lower surface of the polarization film 232 by the second adhesive film 233'.

An adhesive member 10' is disposed on the lower surface of the retardation film 234' in the display area DA, and the display panel 100 is disposed on the lower surface of the adhesive member 10'. The lower surface of the retardation film 234' is attached to the upper surface of the display panel 100 by the adhesive member 10' in the display area DA.

A sum of thicknesses of the first adhesive film 231, the polarization film 232, the second adhesive film 233', and the retardation film 234' is set to the second thickness T2. A sum of thicknesses of the second adhesive film 233' and the retardation film 234' is set to a third thickness T3.

The side surfaces of the first adhesive film 231 and the polarization film 232 of the polarization layer 230' make contact with the inner side surface of the first, second, and third printed layers 221, 222, and 223 at the boundary surface BL. Accordingly, the predetermined space, such as a gap, is not formed in the vertical boundary area BA.

Consequently, the image display apparatus 400 may improve the defects caused by the step difference on the window layer 200'.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. An image display apparatus, comprising:
   a display panel that displays an image; and
   a window layer disposed on the display panel and including
     a display area transmitting the image and
     a non-display area surrounding the display area,
   the window layer comprising:
     a window cover disposed to face the display panel;
     a decorated printed layer disposed on a lower surface of the window cover in the non-display area; and
     a polarization layer disposed on the lower surface of the window cover in the display area and disposed in the non-display area to cover the decorated printed layer,
   wherein the polarization layer, comprise:
     a polarization film;
     a retardation film overlapped with the polarization film;
     a first adhesive film disposed on and between the window cover and the polarization film; and
     a second adhesive film disposed on and between the polarization film and the retardation film, and
   wherein the polarization layer has a step difference at a boundary surface between the display area and the non-display area,
   a side surface of the polarization film makes contact with an inner side surface of the decorated printed layer at the boundary surface,
   a side surface of the retardation film is overlapped with the decorated printed layer,
   the first adhesive film and the polarization film are disposed in a region which is surrounded by the decorated printed layer when viewed in a plane, and
   the second adhesive film and the retardation film cover the decorated printed layer and the polarization film.

2. The image display apparatus of claim 1, wherein the decorated printed layer has a first thickness, the polarization layer has a second thickness in the display area and a third thickness in the non-display area, and a sum of the first thickness and the third thickness is equal to the second thickness.

3. The image display apparatus of claim 2, wherein a sum of a thickness of the first adhesive film and a thickness of the polarization film is equal to the first thickness, a sum of the thickness of the first adhesive film, the thickness of the polarization film, a thickness of the second adhesive film, and a thickness of the retardation film is equal to the second thickness, and a sum of the thickness of the second adhesive film and the thickness of the retardation film is equal to the third thickness.

4. The image display apparatus of claim 2, wherein each of the first and second adhesive films is an acrylic adhesive.

5. The image display apparatus of claim 1, further comprising an adhesive member disposed between the polarization layer and the display panel, wherein the polarization layer and the display panel are attached to each other by the adhesive member.

6. The image display apparatus of claim 1, wherein the decorated printed layer comprises a plurality of printed layers each having a predetermined color.

7. An image display apparatus comprising:
   a display panel that displays an image; and
   a window layer disposed on the display panel and including
     a display area transmitting the image and
     a non-display area surrounding the display area,
   the window layer comprising:
     a window cover disposed to face the display panel;
     a decorated printed layer disposed on a lower surface of the window cover in the non-display area; and
     a polarization layer disposed on the lower surface of the window cover only in the display area, the polarization layer having a thickness thicker than a thickness of the decorated printed layer wherein the polarization layer comprises:
     a polarization film;
     a retardation film overlapped with the polarization film;
     a first adhesive film disposed on and between the window cover and the polarization film; and
     a second adhesive film disposed on and between the polarization film and the retardation film, and
   wherein
     a side surface of the polarization film makes contact with an inner side surface of the decorated printed layer at a boundary surface,
     the first adhesive film and the polarization film are disposed in a region which is surrounded by the decorated printed layer when viewed in a plane, and
     the second adhesive film and the retardation film do not extend beyond the boundary surface.

8. The image display apparatus of claim 7, wherein the decorated printed layer has a first thickness, and a sum of a thickness of the first adhesive film and a thickness of the polarization film is equal to the first thickness.

* * * * *